United States Patent
Geisler et al.

(10) Patent No.: US 11,561,863 B2
(45) Date of Patent: Jan. 24, 2023

(54) PDSE MEMBER GENERATION CLUSTERING AND RECOVERY

(71) Applicant: International Business Machines Corporation, Armonk, NY (US)

(72) Inventors: Trevor A. Geisler, Tucson, AZ (US); David C. Reed, Tucson, AZ (US); Thomas C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1189 days.

(21) Appl. No.: 14/831,101

(22) Filed: Aug. 20, 2015

(65) Prior Publication Data

US 2017/0052849 A1  Feb. 23, 2017

(51) Int. Cl.
*G06F 11/14* (2006.01)
*G06F 16/27* (2019.01)
*G06F 16/21* (2019.01)

(52) U.S. Cl.
CPC ...... *G06F 11/1446* (2013.01); *G06F 11/1474* (2013.01); *G06F 16/219* (2019.01); *G06F 16/278* (2019.01)

(58) Field of Classification Search
CPC ........... G06F 11/1446; G06F 17/30309; G06F 17/30584
See application file for complete search history.

(56) References Cited

U.S. PATENT DOCUMENTS

| | | | | |
|---|---|---|---|---|
| 8,315,992 B1* | 11/2012 | Gipp | ............ | G06F 11/1453 707/692 |
| 2002/0156986 A1* | 10/2002 | Fujimura | ............ | G11B 27/036 711/200 |
| 2005/0262097 A1 | 11/2005 | Sim-Tang et al. | | |
| 2008/0144080 A1* | 6/2008 | Randt | ............ | G06F 3/121 358/1.15 |
| 2008/0184063 A1* | 7/2008 | Abdulvahid | ........ | G06F 11/1469 714/6.3 |
| 2010/0161556 A1* | 6/2010 | Anderson | ............ | G06F 16/174 707/638 |

(Continued)

OTHER PUBLICATIONS

Winnard, K. et al.; "DFSMShsm: Managing PDSE V2 Data Sets"; IBM Corporation; www.ibm.com/redbooks/redp5160; Apr. 2015.

*Primary Examiner* — Ashish Thomas
*Assistant Examiner* — Dustin D Eyers
(74) *Attorney, Agent, or Firm* — Nelson IP; Daniel P. Nelson

(57) ABSTRACT

A method for enabling data set changes to be reverted to a prior point in time or state is disclosed. In one embodiment, such a method includes providing a data set comprising one or more data elements and a specified number of generations of the data elements. In certain embodiments, the data set is a partitioned data set extended (PDSE) data set, and the data elements are "members" within the PDSE data set. The method further includes tracking changes made by a job to data elements of the data set. The method further references, in a data structure (also referred to herein as a "cluster") associated with the job, previous generations of the data elements changed by the job. In certain embodiments, the data structure is stored in the data set. A corresponding system and computer program product are also disclosed.

14 Claims, 6 Drawing Sheets

(56) References Cited

U.S. PATENT DOCUMENTS

| | | | |
|---|---|---|---|
| 2010/0191705 A1* | 7/2010 | Barabas | G06F 16/2379 |
| | | | 707/626 |
| 2012/0005528 A1* | 1/2012 | Belisle | G06F 11/1435 |
| | | | 714/15 |
| 2013/0007292 A1* | 1/2013 | Reed | G06F 3/0617 |
| | | | 709/228 |
| 2013/0339643 A1* | 12/2013 | Tekade | G06F 17/30581 |
| | | | 711/162 |
| 2014/0081916 A1 | 3/2014 | McAlister et al. | |
| 2014/0201363 A1 | 7/2014 | McAlister et al. | |

* cited by examiner

PDSE MEMBER GENERATION CLUSTERING AND RECOVERY

BACKGROUND

Field of the Invention

This invention relates to systems and methods for enabling changes to a data set to be reverted to a prior point in time or state.

Background of the Invention

In the z/OS operating system, PDSE (partitioned data set extended) data sets are used to simply and efficiently organize related groups of sequential files, also referred to as "members." Files stored as members of a PDSE data set may be processed individually or as a unit. Current versions of PDSE data sets may support multiple levels, or generations, of members. Using this feature, when a member is changed, a new member may be created and the older version of the member may be retained, up to a specified number of generations. This feature advantageously enables recent changes to a member to be reversed. This feature also allows multiple generations of a member to be retained for archival reasons. The retained generations may be structured in a first in, first out (FIFO) configuration, such that an oldest generation is discarded when the retained generation limit is reached.

Unfortunately, while PDSE data sets may enable individual members to be recovered to various points in time or states, there is no way to determine which members of a PDSE data set were affected by a particular run of a job. There is also no way to determine whether reversing changes of a single member of a PDSE data set will have adverse affects on the PDSE data set due to data dependencies or other relationships. This can limit the usefulness of the PDSE generations feature. It can also make it difficult or impossible to reverse changes made to a PDSE data set by a particular job or task, since no functionality to enable such is provided.

In view of the foregoing, systems and methods are needed to determine which members of a PDSE data set were affected by a particular task or job. Ideally, such systems and methods will increase the usefulness of PDSE generations and enable changes made to a PDSE data set by a particular job or task to be safely reversed.

SUMMARY

The invention has been developed in response to the present state of the art and, in particular, in response to the problems and needs in the art that have not yet been fully solved by currently available systems and methods. Accordingly, the invention has been developed to provide systems and methods to dynamically modify generation depth in PDSE or similar data sets. The features and advantages of the invention will become more fully apparent from the following description and appended claims, or may be learned by practice of the invention as set forth hereinafter.

Consistent with the foregoing, a method for enabling data set changes to be reverted to a prior point in time or state is disclosed herein. In one embodiment, such a method includes providing a data set comprising one or more data elements and a specified number of generations of the data elements. In certain embodiments, the data set is a partitioned data set extended (PDSE) data set, and the data elements are "members" within the PDSE data set. The method further includes tracking changes made by a job to data elements of the data set. The method further references, in a data structure (also referred to herein as a "cluster") associated with the job, previous generations of the data elements changed by the job. In certain embodiments, the data structure is stored in the data set. The data structure may enable the data set to be reverted to the state that it was in prior to changes by the job. A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
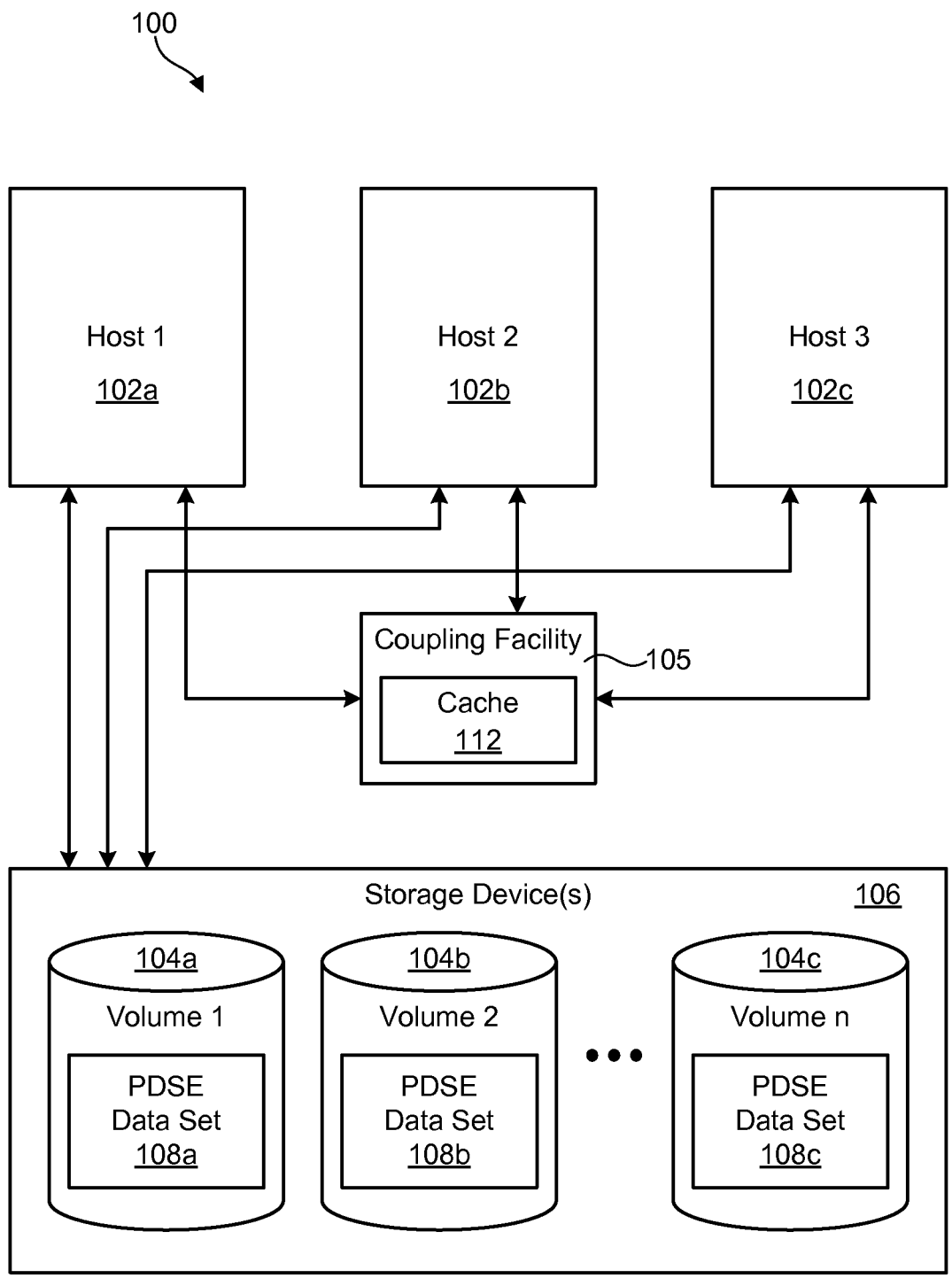
FIG. 1 is a high-level block diagram showing one example of an environment in which a system and method in accordance with the invention may operate.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer-readable program instructions thereon for causing a processor to carry out aspects of the present invention.

The computer-readable storage medium may be a tangible device that can retain and store instructions for use by an instruction execution device. The computer-readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one embodiment an environment 100 for implementing a system and method in accordance with the invention is illustrated. In the illustrated embodiment, the environment 100 is an IBM Sysplex® environment 100. Nevertheless, embodiments of the invention are not limited to operating within an IBM Sysplex® environment 100 but may include any comparable or analogous environment, regardless of the manufacturer, product name, or components or component names associated with the environment. Furthermore, any environment that could benefit from one or more embodiments of the invention is deemed to fall within the scope of the invention. Moreover, systems and methods in accordance with the invention may be used in any environment that exhibits the same issues or problems disclosed herein. Such environments are also deemed to fall within the scope of the present invention. Thus, the Sysplex® environment 100 is presented only by way of example and is not intended to be limiting.

A Sysplex® environment 100 may be configured to enable multiple mainframe processors of host systems 102a-c to act as a single unit and share the same data, while ensuring data integrity, enabling resource sharing, and performing workload balancing. For example, the host systems 102a-c may share data stored in one or more storage device (e.g., DASD) volumes 104a-c. A coupling facility 105 may include computer hardware and/or software that enable the host systems 102a-c to share the same data. In certain embodiments, the coupling facility 105 may include cache 112 to store information shared among the attached host systems 102a-c.

As mentioned, the host systems 102a-c may share data stored in one or more volumes 104a-c stored on one or more storage devices 106. The storage devices 106 may include single disk drives or solid state drive s, arrays of disk drives or solid state drives, or other storage devices 106 known to those of skill in the art. The volumes 104a-c may reside on a single storage device 106 or span multiple storage devices 106.

Figure 2:
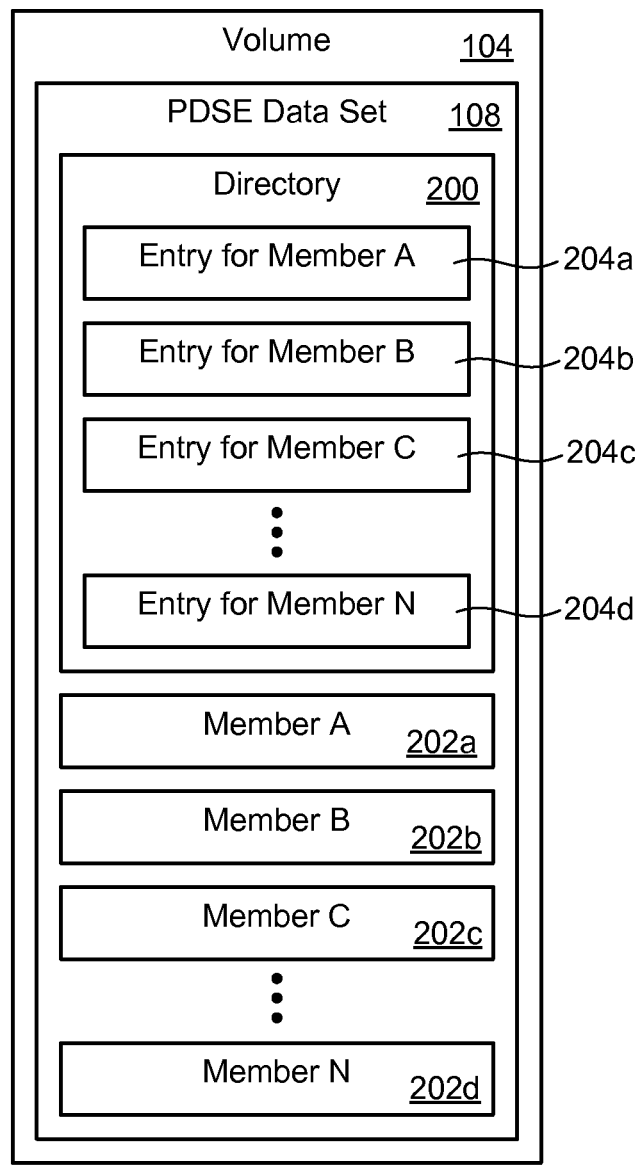
FIG. 2 is a high-level block diagram showing an organization of a PDSE data set.

Referring to FIG. 2, while continuing to refer generally to FIG. 1, in selected embodiments, each of the volumes 104a-c may store one or more data sets 108a-c. In certain embodiments, these data sets 108a-c include PDSE data sets 108a-c. As previously explained, a PDSE (partitioned data set extended) data set 108 may be used to simply and efficiently organize related groups of sequential data elements, also referred to herein as files or "members." As also explained, a PDSE data set 108 may support multiple levels, or generations, of members. Using this feature, when a member is changed, a new member is created and the older version of the member is retained, up to a specified number of generations. This feature may enable recent changes to a member to be reversed. This feature may also enable multiple generations of a member to be retained for archival reasons. The retained generations may be structured in a first in, first out (FIFO) configuration, such that an oldest generation is discarded when the retained generation limit is reached.

As shown in FIG. 2, a PDSE data set 108 may include a directory 200 and one or more members 202a-d. Each member 202 may contain sequential data and have a name up to a specified number of characters. Each member 202 may include one or more generations, meaning that previous versions of the member 202 may be retained and stored in the PDSE data set 108. The directory 200 may contain entries 204a-d for the members 202 in the PDSE data set 108. Each entry 204 may include the name of the corresponding member 202, a pointer to the member 202, and other attributes associated with the member 202.

As was also previously explained, while PDSE data sets may enable individual members to be recovered to various points in time, there is no way to determine which members of PDSE data set were affected by a particular run of a job. There is also no current way to determine whether reversing changes of a single member of a PDSE data set will have adverse affects on the PDSE data set due to data dependencies or other relationships. This can limit the usefulness of the PDSE generations feature. It can also make it difficult or impossible to reverse changes made to a PDSE data set by a particular job or task, since no functionality to enable such is provided.

Figure 3:
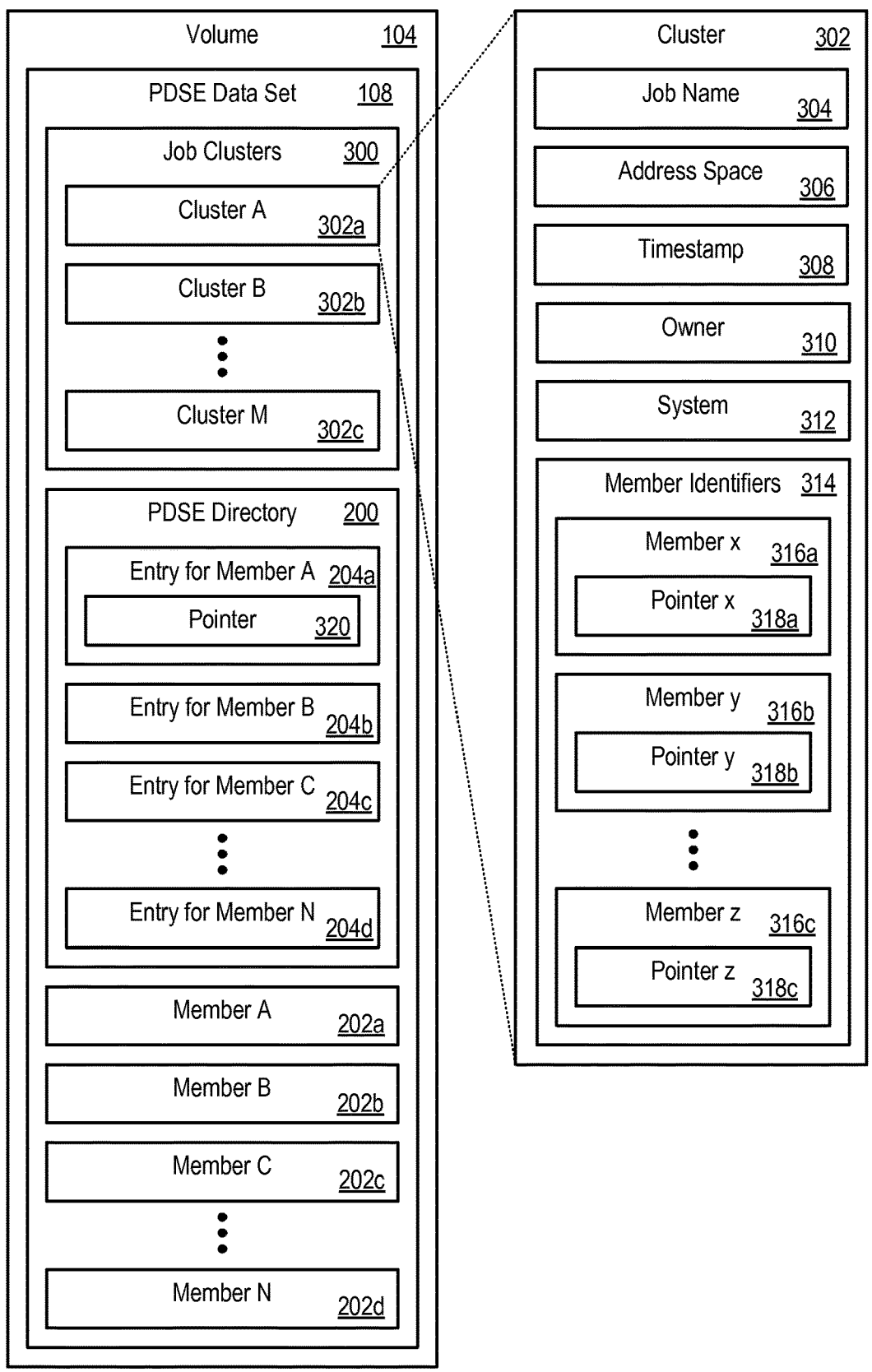
FIG. 3 is a high-level block diagram showing a data structure (i.e. "cluster"), used to track changes by a job, incorporated into a PDSE data set.

Referring to FIG. 3, in certain embodiments in accordance with the invention, functionality may be provided to track changes made to a PDSE data set 108 by a particular run of a job. Such functionality may increase the usefulness of PDSE generations and enable changes made to a PDSE data set by a particular job or task to be safely reversed to a point in time or state. To provide such functionality, a new data structure 302 (also referred to herein as a "cluster" 302) may be created that records information about a job, including which member generations were modified by the job or existed immediately prior to changes by the job. This functionality may link generations from various members 202 into logical clusters which represent the summation of members 202 affected by the run of a job. In certain embodiments, the data structure 302 is stored in the PDSE data set 108, as shown in FIG. 3. As can be observed, the data set 108 may store a cluster 302 for each job that modifies the data set 108.

As shown in FIG. 3, a cluster 302 in accordance with the invention may contain various types of information about a job and it's connection to the PDSE data set 108, such as the job's name 304, the address space 306 associated with the job, a timestamp 308 associated with the job (e.g., when the job executed), an owner 310 of the job (e.g., who ran the job), and a system 312 on which the job ran. The cluster 302 may also contain information about members 202 of the PDSE data set 108 affected by the job. For example, the cluster 302 may include references 316a-c to members 202 updated or created by a job, as well as pointers 318a-c to previous versions (or generations) of the members 202. This information may enable changes by a job to be reversed by allowing the members affected by the job to be restored to previous versions or generations. This, in essence, provides job-level "undo" capability.

As shown in FIG. 3, for each member 202 modified by a job and recorded in a cluster 302, a pointer 320 may be added to the member's attributes 204 that points to the cluster 302. Thus, in certain embodiments, not only does the cluster 302 contain references to members 202 and previous generations modified by the job, but the attributes 204 for the modified members 202 may contain pointers back to the cluster 302. This in effect marks the state of members 202 prior to changes by a job. As will be explained in more detail hereafter, when a generation of a member 202 is deleted, such as when a member 202 reaches its maximum generational storage limit, the pointer 320 may indicate that the deleted generation is associated with a particular cluster 302. Deleting a generation associated with a cluster 302 may invalidate the cluster 302 since the cluster 302 can no longer guarantee that a data set 108 can be returned to the point-in-time prior to the job associated with the cluster 302. Since this guarantee no longer exists, the cluster 302 loses its utility. Once this happens, the cluster 302 may be deleted not only from the data set 108, but also from a log structure 400 in the coupling facility 105 (The purpose of the log structure 400 will be discussed in association with FIG. 4).

Figure 4:
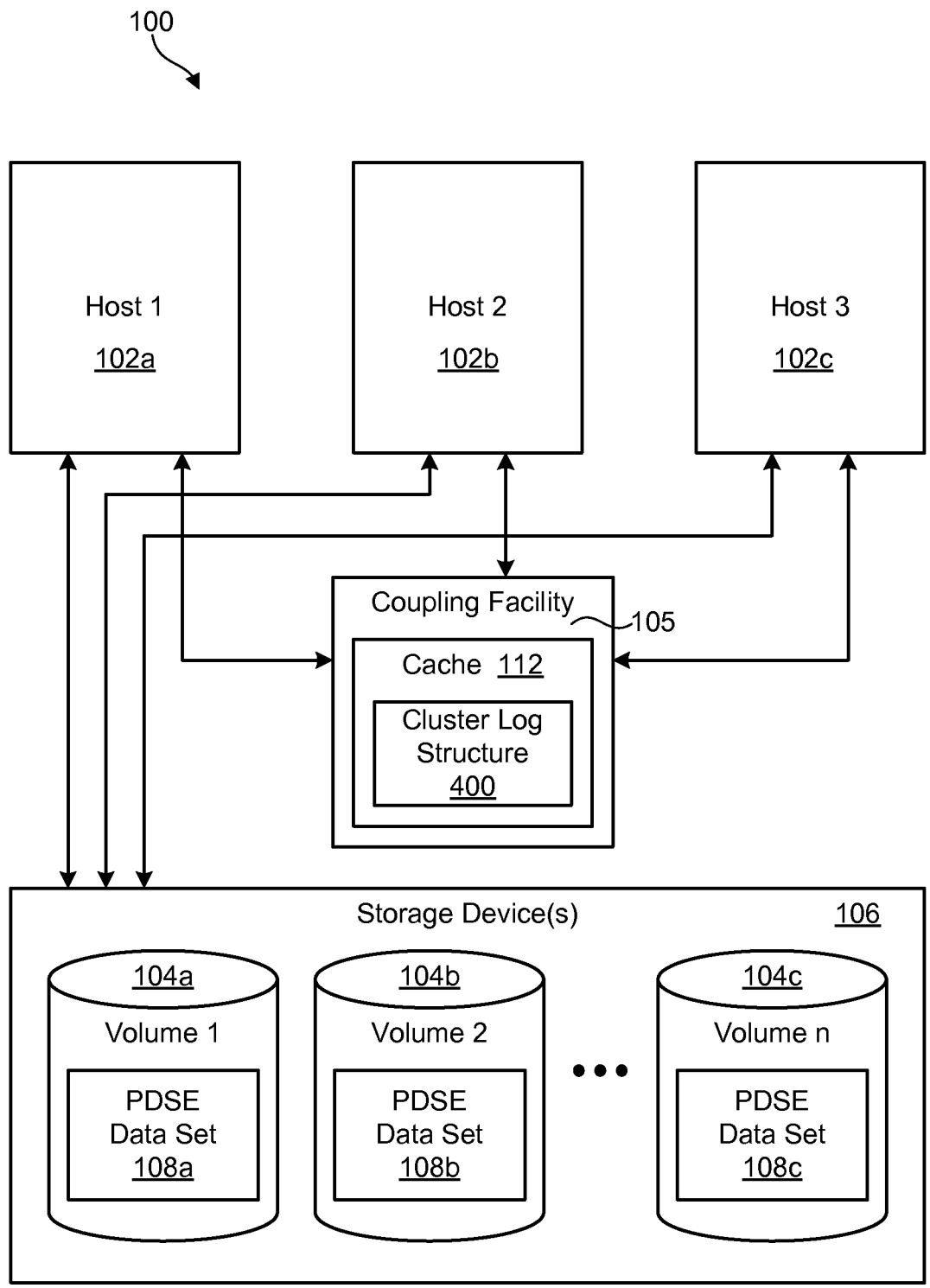
FIG. 4 shows a cluster log structure stored in a coupling facility of an IBM Sysplex® environment.

Referring to FIG. 4, in certain embodiments, a second data structure 400 (referred to herein as a "cluster log structure" 400 or "log structure" 400) may be established and maintained in shared memory, such as the coupling facility 105 previously discussed. This log structure 400 may record the order and times that clusters 302 were created, thereby providing a timeline of when jobs modified the data set 108. The log structure 400 may only contain or list clusters 302 that are still valid, meaning that the log structure 400 represents the sum of all possible changes to the data set's members 202 that can be successfully reversed. If a cluster 302 is no longer valid (meaning that changes associated with the cluster 302 can no longer be successfully reversed), the cluster 302 may be deleted from the log structure 400. The log structure 400 may be stored in the coupling facility 105 to enable all participating sharing systems 102 to have access to cluster data that is guaranteed to be valid. The manner in which the log structure 400 is kept up-to-date will be discussed in association with FIGS. 5 and 6.

Figure 5:
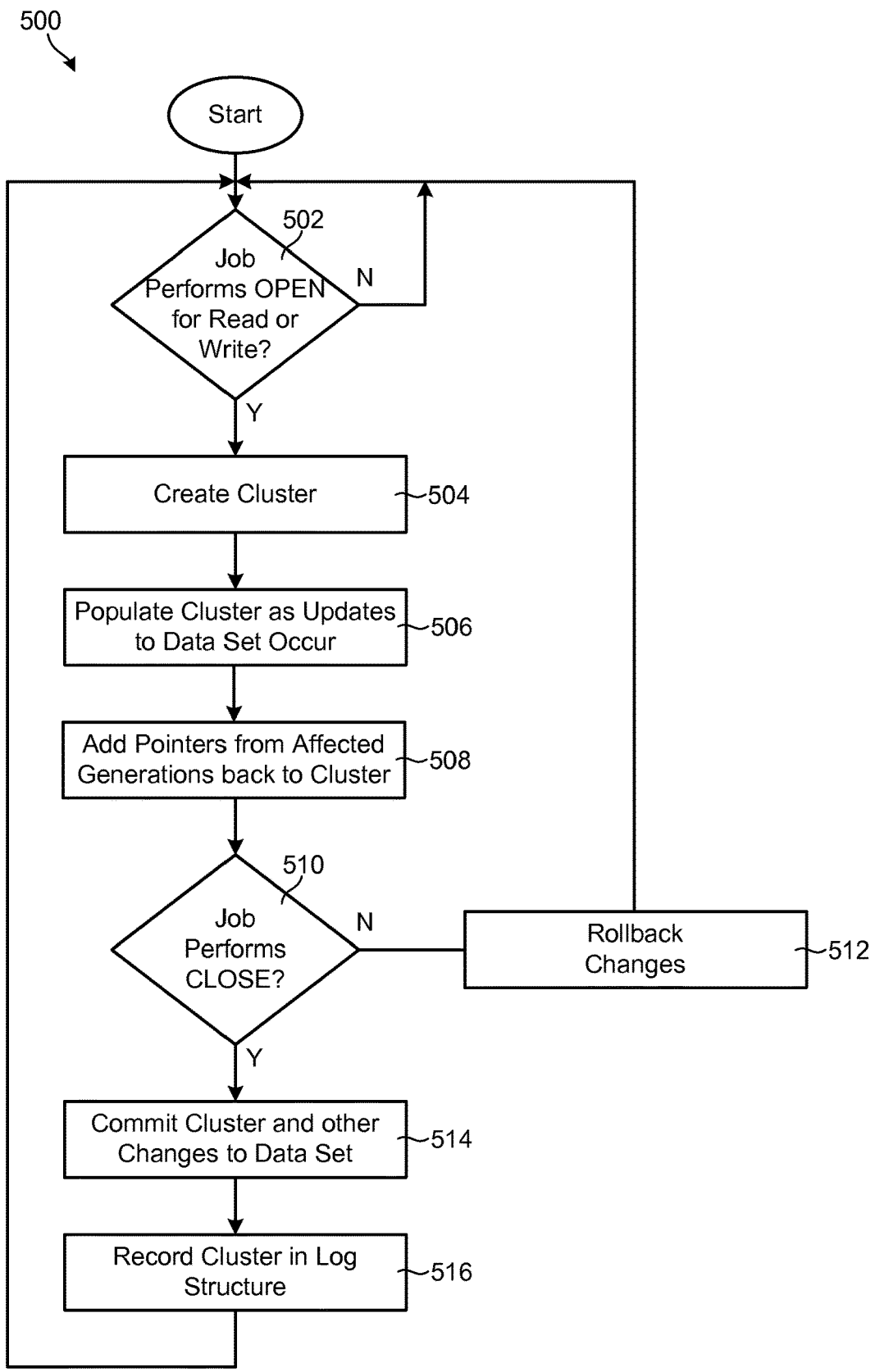
FIG. 5 shows one embodiment of a method for creating and populating a cluster.

Referring to FIG. 5, one embodiment of a method 500 for creating and populating a cluster 302 is illustrated. As shown, the method 500 initially monitors 502 whether a job has opened a PDSE data set 108 to read or write thereto. When a job accesses a PDSE data set 108, it begins by doing an OPEN for INPUT or OUTPUT. This begins the JOIN process by which the PDSE access method acquires the necessary lock state to serialize a request on behalf of the connecting job.

If, at step 502, a job opens the data set 108, the method 500 creates 504 a cluster 302 associated with the job and populates 506 the cluster 302 with information related to the job, such as the information 304, 306, 308, 310, 312 discussed in association with FIG. 3. In essence, the method 600 creates a cluster 302 in anticipation that the job will replace/delete a primary member 202 of the PDSE data set 108. When a job requests a commit during an OPEN for OUTPUT to a PDSE data set 108, the member 202 is replaced rather than directly edited. If that PDSE data set 108 has its multiple generation feature enabled then the primary member 202 becomes a generation of that member 202 and the committed member 202 becomes the primary member 202. This same process also applies to delete processing.

When a commit from a job results in a new generation being created in the PDSE data set 108, the method 500 records 506 the updates in the cluster 302, such as listing the name of the primary member 202 that had a new generation created, and providing a pointer to the member's generation that existed prior to the job. The method 500 may also add a pointer 320 from the affected generation back to the cluster 302, as was discussed in association with FIG. 3. In the event a generation is deleted that points back to a cluster 302, the cluster 302 may be deleted or invalidated since the cluster 302 will no longer be useful in reversing changes associated with a particular job.

When the job closes 510 the PDSE data set 108 (i.e., the job CLOSEs the connection to the PDSE data set 108), the method 500 commits the cluster 302 and other changes (member updates, etc.) to the data set 108 and records the cluster 302 and time of the final commit in the log structure 400 previously discussed. Otherwise, the cluster 302 and changes to the data set 108 are rolled back 512. The method 500 may then repeat by waiting 502 for a new job to open a data set 108 to perform reads or writes thereto.

Figure 6:
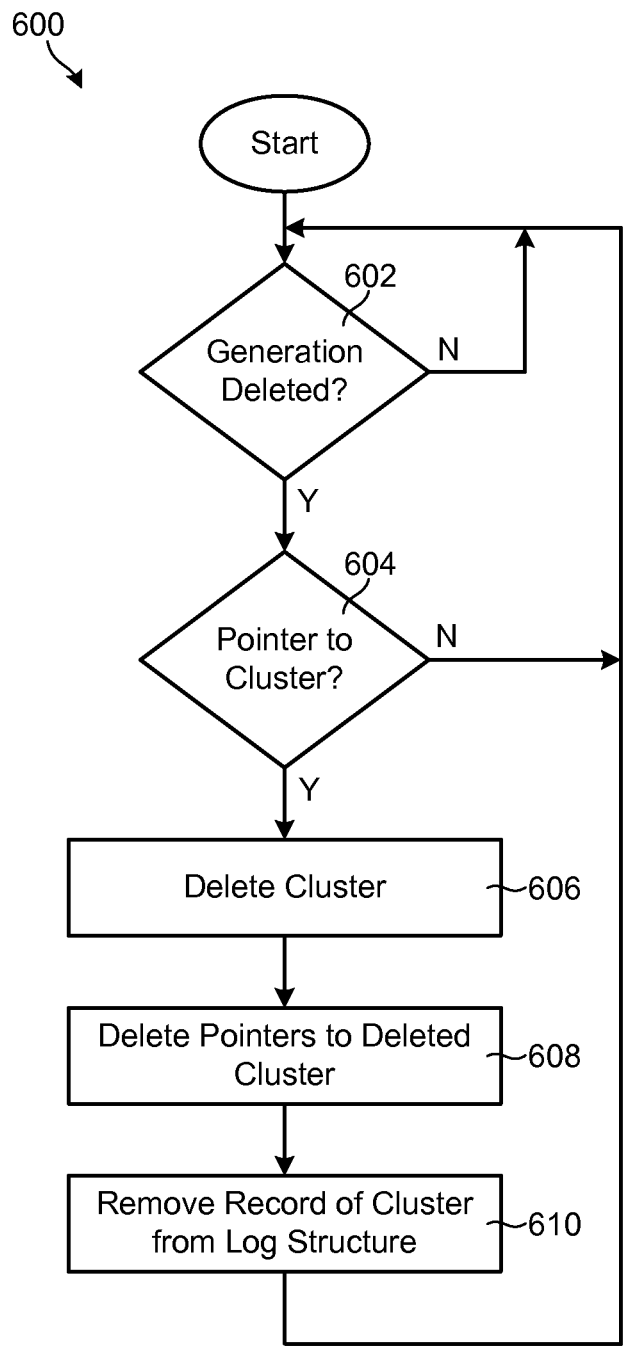
FIG. 6 shows one embodiment of a method for removing/invalidating a cluster when a generation associated with the cluster is deleted.

Referring to FIG. 6, one embodiment of a method 600 for removing/invalidating a cluster 302 is illustrated. Such a method 600 may be executed when a generation associated with a cluster 302 is deleted. As shown, the method 600 initially determines 602 whether a generation from a PDSE data set 108 has been deleted. If a generation has been deleted, the method 600 determines 604 whether the generation points to a cluster 302. If the generation points to a cluster 302, the method 600 deletes 606 the cluster 302 from the data set 108 since the cluster 302 is no longer valid. The method 600 then deletes 608 any references to the cluster 302. For example, if other non-deleted generations in the data set 108 also point to the cluster 302, these references are removed 608 since the cluster 302 is invalid or no longer exists. The method 600 then removes 610 the cluster 302 from the log structure 400 previously discussed. This will ensure that the log structure 400 only references clusters 302 that are valid.

Although particular reference has been made herein to PDSE data sets 108, the systems and methods disclosed herein may be equally applicable to other types of data sets with similar characteristic. For example, any type of data set 108 that stores multiple data elements (e.g., members, files, etc.) as well as a number of previous generations of the data elements may beneficially utilize the systems and methods disclosed herein to more efficiently utilize storage space. Thus, the systems and methods disclosed herein are not limited to PDSE data sets 108.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to enable data set changes to be reverted to a prior point in time or state, the method comprising:
   providing a data set comprising one or more data elements and a specified number of generations of the data elements;
   tracking changes made by a job to data elements of the data set;
   identifying, in a job cluster stored in the data set and associated with the job, previous generations of the data elements changed by the job;
   providing attributes associated with the previous generations that point back to the job cluster; and
   safely reversing changes made to the data set by the job as follows:
      finding, in the data set using identifying information associated with the job, the job cluster associated with the job;
      reading the job cluster to determine which linked set of generations were modified by the job; and
      rolling back the data elements to correspond to the linked set of generations.

2. The method of claim 1, wherein the data elements are members within a partitioned data set extended (PDSE) data set.

3. The method of claim 1, further comprising retiring the job cluster when at least one generation referenced by the job cluster is permanently deleted from the data set.

4. The method of claim 1, further comprising referencing the job cluster in a log structure outside of the data set.

5. The method of claim 4, further comprising removing the job cluster from the log structure when the job cluster is invalid.

6. A computer program product to enable data set changes to be reverted to a prior point in time or state, the computer program product comprising a non-transitory computer-readable storage medium having computer-usable program code embodied therein, the computer-usable program code comprising:
   computer-usable program code to provide a data set comprising one or more data elements and a specified number of generations of the data elements;
   computer-usable program code to track changes made by a job to data elements of the data set;
   computer-usable program code to identify, in a job cluster stored in the data set and associated with the job, previous generations of the data elements changed by the job;
   computer-usable program code to provide attributes associated with the previous generations that point back to the job cluster; and
   computer-usable program code to safely reverse changes made to the data set by the job as follows:
      find, in the data set using identifying information associated with the job, the job cluster associated with the job;
      read the job cluster to determine which linked set of generations were modified by the job; and
      roll back the data elements to correspond to the linked set of generations.

7. The computer program product of claim 6, wherein the data elements are members within a partitioned data set extended (PDSE) data set.

8. The computer program product of claim 6, further comprising computer-usable program code to invalidate the job cluster when at least one generation referenced by the job cluster is permanently deleted from the data set.

9. The computer program product of claim 6, further comprising computer-usable program code to reference the job cluster in a log structure outside of the data set.

10. The computer program product of claim 9, further comprising computer-usable program code to remove the job cluster from the log structure when the job cluster is invalid.

11. A system to enable data set changes to be reverted to a prior point in time or state, the system comprising:
    at least one processor;
    at least one memory device operably coupled to the at least one processor and storing instructions for execution on the at least one processor, the instructions causing the at least one processor to:
        provide a data set comprising one or more data elements and a specified number of generations of the data elements;
        track changes made by a job to data elements of the data set; and
        identify, in a job cluster stored in the data set and associated with the job, previous generations of the data elements changed by the job;
        provide attributes associated with the previous generations that point back to the job cluster; and
        safely reverse changes made to the data set by the job as follows:
            find, in the data set using identifying information associated with the job, the job cluster associated with the job;
            read the job cluster to determine which linked set of generations were modified by the job; and
            roll back the data elements to correspond to the linked set of generations.

12. The system of claim 11, wherein the data elements are members within a partitioned data set extended (PDSE) data set.

13. The system of claim 11, wherein the instructions further cause the at least one processor to invalidate the job cluster when at least one generation referenced by the job cluster is permanently deleted from the data set.

14. The system of claim 11, wherein the instructions further cause the at least one processor to reference the job cluster in a log structure outside of the data set, and remove the job cluster from the log structure when the job cluster is invalid.

* * * * *